United States Patent
McGurran et al.

(10) Patent No.: US 6,569,517 B1
(45) Date of Patent: May 27, 2003

(54) COLOR TAILORABLE PIGMENTED OPTICAL BODIES WITH SURFACE METALIZATION

(75) Inventors: Daniel J. McGurran, Woodbury, MN (US); Laurence R. Gilbert, Marine on St. Croix, MN (US); Bryan L. Klaenhammer, River Falls, WI (US); James A. Olson, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 131 days.

(21) Appl. No.: 09/714,932

(22) Filed: Nov. 17, 2000

(51) Int. Cl.$^7$ .................................................. B32B 5/16
(52) U.S. Cl. ..................... 428/323; 359/582; 359/585; 359/589; 428/328; 428/336; 428/337; 428/458
(58) Field of Search ................................ 428/323, 458, 428/328, 336, 337, 457; 359/582, 585, 589

(56) References Cited

U.S. PATENT DOCUMENTS

| | | |
|---|---|---|
| 4,408,004 A | 10/1983 | Pengilly |
| 4,457,977 A | 7/1984 | Walles |
| 4,476,272 A | 10/1984 | Pengilly |
| 4,546,036 A | 10/1985 | Renalls et al. |
| 4,603,073 A | 7/1986 | Renalls et al. |
| 4,604,303 A | 8/1986 | Takakura et al. |
| 4,657,786 A | 4/1987 | Sirinyan et al. |
| 4,737,559 A | 4/1988 | Kellen et al. |
| 4,856,857 A | 8/1989 | Takeuchi et al. |
| 4,865,898 A | 9/1989 | Fukuda et al. |
| 4,873,136 A | 10/1989 | Foust et al. |
| 4,997,674 A | 3/1991 | Parr et al. |
| 5,137,791 A | 8/1992 | Swisher |
| 5,158,860 A | 10/1992 | Gulla et al. |
| 5,262,470 A | 11/1993 | Shimotsuma et al. |
| 5,281,483 A | 1/1994 | Hwo |
| 5,416,622 A | 5/1995 | Engfer et al. |
| 5,423,974 A | 6/1995 | St.-Amant et al. |
| 5,516,456 A | 5/1996 | Shinohara et al. |
| 5,599,592 A | 2/1997 | Laude |
| 5,656,355 A * | 8/1997 | Cohen .......................... 428/138 |
| 5,699,188 A | 12/1997 | Gilbert et al. |
| 5,867,238 A | 2/1999 | Miller et al. |
| 5,968,664 A | 10/1999 | Heberger et al. |
| 6,074,740 A * | 6/2000 | Scheckenbach et al. ..... 428/327 |
| 6,080,467 A * | 6/2000 | Weber et al. ................. 428/212 |
| 6,088,163 A | 7/2000 | Gilbert et al. |
| 6,111,696 A | 8/2000 | Allen et al. |
| 6,391,410 B1 * | 5/2002 | Peiffer et al. ............... 428/35.7 |
| 6,396,631 B1 * | 5/2002 | Ouderkirk .................... 359/500 |
| 6,498,683 B2 * | 12/2002 | Condo et al. ................ 359/589 |

FOREIGN PATENT DOCUMENTS

| | | |
|---|---|---|
| DE | 100 26 717 A1 | 12/2001 |
| EP | 0 936 227 A1 | 8/1999 |
| EP | 0 987 567 A1 | 3/2000 |
| WO | WO 99/18255 | 4/1966 |
| WO | WO 93/15906 | 8/1993 |
| WO | WO 95/17303 | 6/1995 |
| WO | WO 95/17699 | 6/1995 |
| WO | WO 96/19347 | 6/1996 |
| WO | WO 97/01440 | 1/1997 |
| WO | WO 97/01774 | 1/1997 |
| WO | WO 97/32226 | 9/1997 |
| WO | WO 99/36248 | 7/1999 |
| WO | WO 99/36262 | 7/1999 |
| WO | WO 00/20656 | 4/2000 |

* cited by examiner

*Primary Examiner*—H. Thi Le
(74) *Attorney, Agent, or Firm*—Bruce E. Black

(57) ABSTRACT

A color-tailorable, surface-metalized, pigmented optical body comprising a single or multiple layer polymeric core comprising at least one layer of a thermoplastic polymer material having dispersed therein a particulate pigment, and a metallic layer located on at least one outer surface of the polymeric core. The optical bodies are generally constructed such that the at least one of the L*, a*, and b* color scales of the polymeric core differs from the L*, a*, and b* color scales of the metallic layer.

58 Claims, 2 Drawing Sheets

COLOR TAILORABLE PIGMENTED OPTICAL BODIES WITH SURFACE METALIZATION

FIELD OF THE INVENTION

The present invention relates to color-tailorable polymeric optical bodies and products made therefrom. More particularly, the present invention relates to color-tailorable pigmented polymeric optical bodies made of polyester with surface metalization.

BACKGROUND OF THE INVENTION

Tinted polymeric films, and particularly tinted polymeric films made of polyester, find utility in a broad range of applications. These films, for example, can be applied to a base transparent substrate (e.g., a window or auto glass pane) to provide neutral (gray) or colored tint to the window or auto glass. They can also be used to tint the surface of a display device, mirror, or other piece of optical equipment.

One method for tinting a polymeric base film employs dyeing the base film with one or more color dyes. Typically in such methods, the neutral or colored tint is obtained by imbibing (or blending) the base film material with a combination of yellow, red, and blue dyes. While these dyed films generally retain high clarity and low haze, prolonged exposure to ultraviolet radiation (which occurs naturally during outdoor use or by exposure to fluorescent light or other UV-emitting light source) can cause significant degradation of the dye molecules and lead to tinting color alteration, tinting power deterioration, bleaching, and reduced light transmission.

Another method sometimes employed for tinting a polymeric film is to apply a pigmented coating to the surface of a base polymeric film. Generally, such coatings are applied as thin layers and employ a relatively high pigment concentration to achieve a desired tint level. These highly-concentrated pigment coatings can suffer numerous processing and performance drawbacks. For example, the high pigment concentrations necessary to achieve requisite tinting strengths are difficult to uniformly disperse within the thin coating, and these high surface pigment concentrations generally suffer faster environmental deterioration. Moreover, such pigmented coatings typically suffer greater haze and reduced clarity.

Yet another method for tinting a polymeric base film employs surface metalization. Polymer films are evenly coated with a metallic layer to provide tinting in applications that require a higher degree of weatherability, such as solar control and commercial glass. Although traditional surface metalization techniques improve environmental stability (i.e. color-stability or colorfastness) of the tinted films, optical properties such as color, transmission, reflectivity, and absorption are constrained to the optical properties of the specific metals and the thickness of the metallic layer. Because of these constraints, applications are limited depending upon the type of metals used.

There exists, therefore, a need for a film that provides the benefits of surface metalization, while still permitting optical properties such as color, transmission, reflectivity, and absorption to be tailored to the specific application.

SUMMARY OF THE INVENTION

Briefly, in one aspect, the present invention provides a color-tailorable, surface-metalized pigmented optical body comprising a single or multiple layer polymeric core. The polymeric core comprises at least one layer of a thermoplastic polymer material having dispersed therein a particulate pigment, and a metallic layer is located on at least one outer surface of the polymeric core.

In another aspect, the present invention provides a color-tailorable, surface-metalized pigmented optical body comprising a single or single or multiple layer polymeric core comprising at least one layer of a thermoplastic polymer material having dispersed therein a particulate pigment, and a metallic layer located on at least one outer surface of the polymeric core. The metallic layer has $L^*_m$, $a^*_m$, and $b^*_m$ color scales, the polymeric core has $L^*_p$, $a^*_p$, and $b^*_p$ color scales, and at least one of the $L^*_m$, $a^*_m$, and $b^*_m$ values differs from the corresponding $L^*_p$, $a^*_p$, and $b^*_p$ values within the visible spectrum.

In another aspect, the invention provides a color-tailorable, surface-metalized pigmented optical body comprising a single or multiple layer polymeric core comprising at least one layer of a thermoplastic polymer material having dispersed therein a particulate pigment, and a metallic layer located on at least one outer surface of the polymeric core. The transmission spectrum of the metallic layer differs from the transmission spectrum of the polymeric core within the visible spectrum.

In yet another aspect, the invention provides a color-tailorable, surface-metalized, pigmented optical body comprising a single or multiple layer polymeric core comprising at least one layer of a thermoplastic polymer material having dispersed therein a particulate pigment, and a metallic layer located on at least one outer surface of the polymeric core. The transmission spectrum of the optical body differs from the transmission spectrum of both the metallic layer and the polymeric core within the visible spectrum.

In still another aspect, the invention provides a color-tailorable, surface-metalized pigmented optical body comprising a single or multiple layer polymeric core, comprising at least one layer of a thermoplastic polymer material having dispersed therein a particulate pigment, and a metallic layer located on at least one outer surface of the polymeric core. The color scales of the optical body are $L^*_o$, $a^*_o$, and $b^*_o$ and the $a^*_o$, and $b^*_o$ values range from about −5 to about 5 within the visible spectrum.

The above summary of the present invention is not intended to describe each illustrated embodiment or every implementation of the present invention. The detailed description and figures which follow more particularly exemplify these embodiments.

DETAILED DESCRIPTION OF PREFERRED EMBODIMENTS

Figure 1:
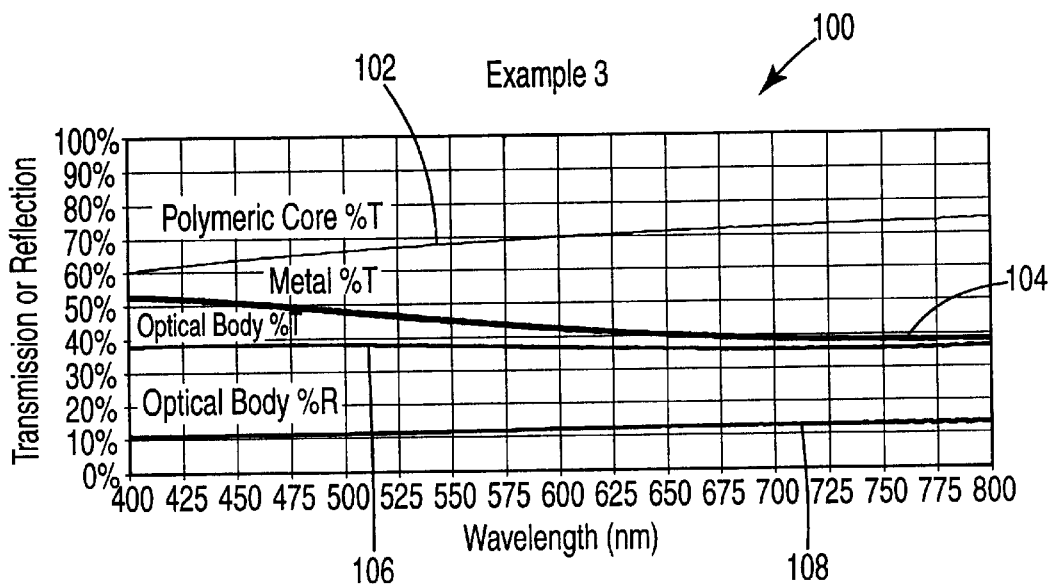
FIG. 1 is a graph of the reflection and transmission spectra of an optical body for one embodiment of the invention, wherein the metallic layer is comprised of aluminum and the polymeric core is comprised of polyethylene terephthalate and carbon black.

The optical bodies of the present invention generally comprise a polymeric core into which a particulate pigment of a selected mean diameter is uniformly dispersed and a metallic layer which is located on at least one outer surface of the polymeric core. The base polymeric core of the optical body comprises at least one oriented or non-oriented thermoplastic pigmented material, which is generally, but not necessarily, in the form of a film. In its entirety the core can be comprised of one, several, or many individual layers. In some embodiments, the core body is a multi-layer optical film. The metallic layer comprises a metal or alloy and generally has a uniform thickness within the outer surface of the optical body. The metallic layer can single or multi-layered. In some embodiments, one or more additional transparent layers are placed in contact with at least one outer surface of the polymeric core and/or at least one outer surface of the metallic layer. These additional layers are sometimes referred to as "skin" layers. In certain configurations, the optical body comprises a metallic layer that is located intermediate between two pigmented, polymeric cores. The optical bodies are generally constructed such that a sufficient percentage of light is transmitted through the optical body, wherein the actual percentage will depend on the desired application. The optical bodies are also generally constructed using complimentary pigments and metals that provide desired optical properties such as color, transmission, reflectivity, and absorption within a desired portion of the visible spectrum (i.e. between about 360 and about 760 nm).

Polymeric Core

The core of the optical body can incorporate any thermoplastic polymer material, including any polyester-containing polymer. Useful polyester polymers include polymers having terephthalate or naphthalate comonomer units, for example, polyethylene naphthalate (PEN), polyethylene terephthalate (PET) and copolymers and blends thereof. Examples of other suitable polyester copolymers are provided in, for example, published patent application WO 99/36262 and in WO 99/36248, both of which are incorporated herein by reference. Other suitable polyester materials include polycarbonates, polyarylates, and other naphthalate and terephthalate-containing polymers, such as, for example, polybutylene naphthalate (PBN), polypropylene naphtahalate (PPN), and blends and copolymers of the above with each other or with non-polyester polymers.

The optical body core can also include or comprise a multilayer optical film. Generally speaking, multilayered optical films are used to create optical interference filters that reflect light via designed constructive interferences between a multiplicity of layers with alternating low and high indices of refraction. Such films can be composed of either isotropic or birefringent layers, or combinations thereof. Birefringent optical films are constructed in mulitlayer "stacks" for which the Brewster angle (the angle at which relfectance of p-polarized light goes to zero) is controlled to a desired value by control of the relative values of the various indices of refraction in the layers. This property allows for the construction of multilayer mirrors and polarizers whose reflectivity for p-polarized light decreases slowly with angle of incidence, are independent of angle of incidence, or that increases with angle of incidence away from the normal. As a result, multilayer films having high reflectivity (for both s- and p-polarized light for any incident direction in the case of mirrors, and for the selected polarization in the case of polarizers) over a wide bandwidth, can be achieved.

Useful multilayer constructions are disclosed, for example, in the following published patent applications, all of whose descriptions are incorporated herein by reference: WO 95/17303, WO 96/19347, and WO 97/01440. Among the most useful films are multilayer constructions made of alternating layers of PEN and a co-polymer of PEN, for example a 70-naphthalate/30 terephthalate co-polyester (co-PEN), or other polymers having a lower refractive index than PEN.

Often, the ability to achieve properties desired in a single or multi-layer polymeric body is influenced by the processing conditions used to prepare it. The polymeric optical body, for example, can be formed by a casting process wherein a molten polymer composition is extruded through a die and cast as a film upon a cooled casting wheel. The desired casting thickness of the cast film will depend in part on the desired use for the optical body, and may be achieved by control of the process conditions under which the body is formed. Typical casting thicknesses range from about 0.3 mm to as much as 3.0 mm, though, depending on the particular end use, thinner or thicker castings can be made.

A cast polymeric body can optionally be oriented, again depending on the particular set of properties desired. Typically, an oriented body is oriented after a quenching process in either or both the lengthwise (sometimes referred to as machine) direction and the transverse (or cross-machine) direction. Although the degree of orientation in either direction can vary greatly (and are not necessarily the same), typically stretching dimensions vary between 2.5 and 5.0 times the body's cast dimensions. A cast polymeric body can also be heated before or during orientation, e.g., by infrared lamps or forced convection, to raise its temperature slightly above its glass transition temperature.

When multilayer optical films are employed, for example, it may be necessary to achieve given relationships among the various indices of refraction (and thus the optical properties) of the multilayer device. In the case of organic polymer films, these properties can be obtained and/or controlled by stretching or orientation. Generally, this is accomplished by preparing the polymer films by co-extruding the individual polymers to form a multilayer film and then orienting the film by stretching at a selected temperature, optionally followed by heat-setting at a selected temperature. Alternatively, the extrusion and orientation steps may be performed simultaneously. In the case of multilayer optical bodies in the form of a polarizer, the multilayer film typically is stretched substantially in one direction (uniaxial orientation). In the case of multilayer optical bodies in the form of a mirror, the film is substantially stretched in two directions (biaxial orientation).

When stretched, the core polymeric body may also be allowed to dimensionally relax in the cross-stretch direction from the natural reduction in cross-stretch (equal to the square root of the stretch ratio) or may also be constrained (i.e., no substantial change in cross-stretch dimensions). The core film may be stretched in the machine direction, as with a length orienter, and in the width direction using a tenter, or at diagonal angles.

It will be understood with respect to such stretching and orientation processes, that the pre-stretch temperature, stretch temperature, stretch rate, stretch ratio, heat set temperature, heat set time, heat set relaxation, and cross-stretch relaxation are selected to yield a film having desired properties, including a desired refractive index relationship. These variables are inter-dependent. For example, a relatively low stretch rate could be used or coupled with, e.g., a relatively low stretch temperature. It will be apparent to one of ordinary skill how to select the appropriate combination of these variables to achieve a desired multilayer device. In general, in the case of multilayer films that are in the form of polarizers, the film is typically stretched along at least one axis. Along this stretch axis, the preferred stretch ratio is 1:2–10 (more preferably 1:3–7). In the case of mirror films, the film is typically stretched along both axes. It is generally preferred that the stretch ratio along both axes (which can be the same or different from one another) be in the range of 1:2–10 (more preferably 1:2–8, and most preferably 1:3–7).

Pigment

The single or multiple layer polymeric core described above further comprises at least one layer of a thermoplastic polymer material wherein dispersed within the thermoplastic material is a particulate pigment or a combination of particulate pigments. The uniformly-dispersed pigment will ideally comprise particles that have mean diameter of between about 10 nm and about 500 nm. The relatively small size of these particles helps reduce the optical body's surface roughness and amount of internal light scattering, which can deleteriously raise the surface and bulk haze of the optical body, respectively. Generally, the most readily available and widely used particulate pigments will be conventional carbon blacks, many different grades of which are available commercially. Other useful pigments include the following: inorganic compounds such as oxides, salts and other compounds of iron, titanium, antimony, zirconium, zinc, barium, calcium, cadmium, lead, chromium, molybdenum, manganese, silicon, aluminum, sodium, cobalt, copper, and other metals, such compounds being exemplified by iron oxides, ammonium ferrocyanides (iron blues), titanium dioxides, antimony oxides, zirconium oxides, zirconium silicates, zinc oxides, zinc sulfides, barium sulfates, calcium carbonates, calcium sulfates, cadmium sulfides, cadmium selenides, lead sulfates, chromium oxides, chromates, molybdates, manganates, silica, silicates, aluminosilicates, sodium alumino sulphosilicates (ultramarines) such as Ultramarine Blue, Ultramarine Violet, and Ultramarine Pink, and other metal oxides, as well as other simple and complex inorganic compounds; inorganic complexes, such as Pigment Blue 28, Cobalt Blue, Cobalt Aluminate, King's Blue, Thenard's Blue, Cadmium Red, Molybdate Orange, Lead Molybdate, Chrome Yellow, Lead Chromates, Chrome Green, Pigment Yellow 53, Titanium Yellow, Nickel Titanate, Nickel Antimony Titanate, Nickel Titanate Yellow, Pigment Violet 16, Manganese Violet, Permanent Violet, Nuremberg Violet, Mineral Violet, and Fast Violet; and organic pigments such as phthalocyanines, copper phthalocyanines, quinacridones, anthraquinones, perylenes, perinones, dioxazines, diketo-pyrrolo-pyrrols (DPPs), indanthrones, benzidines, isoindolines and isoindolinones, benzimidazolones, and azo, disazo, or polyazo pigments (such as Naphthol Red, diarylides, dianisidine, and pyrazolone) including metallized azo pigments (such as Lake Red C, Permanent Red 2B, Nickel Azo Yellow, Lithol Red, and Pigment Scarlet). Pigments such as $V_2O_5$ and $P_2O_5$ can also be useful in absorbing light in the infrared and ultra-violet, as well as visible regions, which may be desirable in certain applications. These various pigments can be used alone or in combination to achieve different tinting tones, absorption profiles, and/or physical properties. The particulate pigment (or pigment blend) should be incorporated within the thermoplastic polymer in proportion to the level of pigmentation, or "tinting," desired for the overall construction. Generally, the particulate pigment will be added to the thermoplastic polymer in an amount between about 0.01 and 1.0 percent by weight, more preferably, between about 0.02 and 0.5 percent by weight, though more or less pigment can be employed depending on the application and particular pigment chosen.

In certain embodiments, two or more particulate pigments can be used in combination with one another to achieve a desired coloration or to optimally control a neutral color. For example, one or more colored pigments or dyes can be combined to make a construction of a given color (e.g., blue) or, where an optimally neutral coloration is desired, a small amount of one or more colored pigments may be added to correct for slight off-color absorption sometimes associated with the use of single pigments. The latter effect, that of optimizing neutral color, can find particular application for use of carbon black, which, when present at relatively high loadings, can display a yellow tint. While not dependent on any particular theory, it is believed that the off-neutral coloring of single pigments is at least in part dependent upon the dispersed particle size of the pigment. Thus, speaking generally, in certain particle size ranges, the larger the particle size of a dispersed pigment, the greater likelihood exists for off-color absorption. It will be understood that where supplemental pigments or dyes are incorporated at levels that do not interfere with the optical properties of the resulting optical bodies, their particle size and character are not critical.

Generally, to be used in the present invention, commercial-sized agglomerates or beads of pigment are reduced to a median diameter of between about 10 and 500 nm. More preferably, the pigment beads are reduced to a diameter of between about 20 and 100 nm. This may be accomplished, for example, by milling the agglomerates in a minimum amount of solvent, for example ethylene glycol, preferably also in the presence of a dispersing agent such as polyvinylpyrrolidone (PVP). Generally, the dispersant (e.g. PVP) is added in an amount from about 1 to 40 parts by weight per 100 parts of carbon black. It will be understood that the optimal ratio of dispersing agent to pigment will vary with the type of pigment used.

The particulate pigment dispersion may be incorporated into thermoplastic polymer material, for example, by milling the pigment into the polymer using conventional mixing and/or milling equipment. A uniform dispersion of the particulate pigment in the thermoplastic material is, however, more readily achieved by dispersing the pigment into the polymer during polymerization. This allows for dispersion of the pigment throughout a relatively low viscosity monomer mixture, avoiding the more difficult milling processes. To accomplish this, the particulate pigment can be dispersed into the polymer reactant medium in a suitable solvent, for example, ethylene glycol, with the aid of PVP or other dispersant. This dispersion may also be added to the reaction mass of a condensation polymer-forming process. Useful uniform dispersion of carbon black particles, for example, can be obtained by adding the milled carbon black, ethylene glycol, and dispersant to the polyester reaction mass immediately following the ester interchange step.

A generally preferred method for incorporating the particulate pigment into the pre-polymerized reaction mass is to first create a slurry of the particulate pigment in ethylene glycol. A useful slurry can be created with 10 percent pigment by weight in the ethylene glycol. As noted above, the slurry can also incorporate one or more wetting or dispersing agents, such as PVP. The slurry can be pre-mixed and, after pre-mixing, be passed several times through a media mill. The milled mixture can also be passed through a fine filter (e.g., on the order of 1 micron) to provide additional particle size control. The final mixture can be charged directly to a reaction vessel along with the pre-polymerized condensation polymer forming reaction mass. The resulting polymer typically will be loaded with about 1 to about 5 percent by weight of the pigment. The high shear mixing both within the mill during mixing and during the polymerization reaction within the reaction vessel can help contribute to the uniformity of the pigment dispersion within the polymer and can help reduce undesired agglomeration of the particles in the polymer resin.

Metallic Layer and Surface Metalization

In accordance with the invention, a metallic layer is typically located over at least one outer surface of the polymeric core. The metallic layer is generally comprised of a single type of metal or a combination of metals in the form of an alloy or a multi-layered metallic layer. In certain embodiments, it may be desirable to use a metallic layer that combines various metals, metal-oxides, and/or alloys in a multi-layered structure. Specific metals and alloys are chosen based on the desired color, transmission, reflectivity, and absorption properties of the optical body. Some examples of suitable metals include aluminum, silver, gold, copper, nickel, titanium, iron, stainless steel, platinum, tin, lead, chromium, inconel, and combinations thereof. Other transition metals, oxides, and alloys thereof will also be suitable for certain applications.

A metallic layer with a uniform thickness over the surface of the polymeric core is desirable for most applications, and the range of acceptable thicknesses will vary depending on: the type of metal or alloy used; the type, concentration, and particle size particulate pigment; and the optical body's intended use. For example, if an optical body is to be constructed with a metallic layer comprising aluminum having a transmission in the visible region in the range of 1 to 90 percent, the thickness of the metallic layer should range between about 29 nm and about 0.5 nm, respectively. If the metallic layer comprises nickel, the range of thickness for a 1 to 90 percent transmission should be between about 52 nm and about 0.5 nm, respectively. For a metallic layer comprised of silver, the range of thickness for a 1 to 90 percent transmission should be between about 69 nm and about 2 nm, respectively. These thickness ranges, however, will also vary with changes in the optical body's particulate pigment type, particle size, and concentration.

The placement of the metallic layer over the polymeric core can be achieved using one of several surface metalization techniques well-known to those of ordinary skill in the art. Such known processes include vapor deposition, cathode sputtering, pyrolysis, powder coating, ion plating, e-beam deposition, and the like. Vapor deposition and cathode sputtering are often preferred in view of the uniformity of structure and thickness that can be obtained. Cathode sputtering is also particularly useful with deposition of metal alloys in order to maintain uniformity in the composition of the metallic layer. As an alternative to surface metalization techniques, the metal layer may also be constructed as a separate sheet and then laminated onto one or more outer surfaces of the polymeric core.

In certain embodiments, it may also be desirable to construct an optical body comprising a metallic layer located intermediate the pigmented polymeric core and an additional layer comprising a thermoplastic material having dispersed therein a particulate pigment. The polymeric core and the additional layer can comprise the same or different polymeric materials or particulate pigments, depending on the desired application.

"Skin" Layers

In accordance with the invention, at least one additional layer can optionally be placed in contact with at least one outer surface of the polymeric core (such that the layer is intermediate to the polymeric core and the metallic layer) and/or at least one outer surface of the metallic layer. This layer, which is sometimes referred to as the "skin" layer, can act to reduce the surface roughness of both the polymeric core and the overall construction and maintain the clarity and low haze of the optical body. The skin layers may also be used to impart scratch resistance, chemical resistance and/or increased weatherability. These skin layers typically are free of particulate pigment. The skin layer or layers can be coextruded onto one or more outer surfaces of the polymeric core. Alternatively, the skin layer or layers can be coated or laminated onto the polymeric core and/or the outer surface of the metal layer using a suitable pressure sensitive or non-pressure sensitive adhesive. Suitable coatings include, but are not limited to, hardcoats, adhesives, antistatics, adhesion promoting primers, UV stabilizing coating, friction reduction layers etc. One or more additional layers (films, laminates, and/or coatings) can also be incorporated along with the skin layers. The skin layers are preferably made of a transparent polymer, for example, a polyester (the same or different as that used in the construction of the polymeric core), polyolefin, polycarbonate, or other thermoplastic polymer.

Color and Optical Properties

The color, transmission, reflectivity, and absorption of the optical body within the visible spectrum can be optimized by simultaneous manipulation of the pigmented polymeric core and the metallic surface layer. The color of the optical body, which can be defined by the L*, a*, and b* color scales, is determined by the respective L*, a*, and b* values of both the polymeric core and the metallic surface layer. The L*, a*, and b* values are based upon the CIE (International Commission on Illumination) method, which determines the color scales using the transmission or reflection of the test material as a function of the wavelength of incident light, the spectral power of a chosen standard illuminant, and the color-matching functions of a CIE standard observer. The CIE procedures for determining L*, a*, and b* values are described in detail in ASTM E308 and ASTM E1164. ASTM E308 discusses the standard practice for computing the colors of objects using the CIE system, and ASTM E1164 discusses the standard practice for obtaining spectrophotmetric data for object-color evaluation. The L*, a*, and b* values cited herein are those determined using transmission within the visible spectrum, the CIE standard Illuminant C (representing daylight), and the color-matching functions of a 2 degree CIE standard observer.

The L*a*b* color scales for a given object serve as coordinates to describe a certain color region in a three-dimensional color space. The a* and b* values describe the hue and saturation of the color. For example, a positive a* value is in the red region, while a negative a* value is located in the green region. A positive b* value is in the yellow region, and a negative b* is in the blue region. While the sign (positive or negative) of the a* and b* values determines the hue of the optical body, the absolute value determines the saturation of that particular hue. An increasing absolute value corresponds to a higher saturation. The L* coordinate relates to the intensity or brightness of the optical body. Larger positive L* values corresponds to the white region, while smaller positive L* values approaching zero correspond to the black region. When the a* and b* color scales of the optical body approach zero, this corresponds to a neutral or gray color region. Therefore, to obtain a gray appearance, the a* and b* color scales should have an absolute value of about 5 or less. More preferably, the a* and b* color scales should have an absolute value of about 3 or less.

Although the L*, a*, and b* color scales can be measured accurately to several decimal places, an appreciable difference between color scales is generally one which can be perceived by the human eye. The human eye perceives differences in the color scales by noticing a change in the color or "shade" of the object. Typically, the human eye can only perceive differences between color scales when the absolute value of the difference is about 1 or more. To illustrate this concept, a human observer can generally perceive two different shades of yellow if one material has a* and b* color scales of 0 and 5, respectively, and the second material has a* and b* color scales of 0 and 6, respectively. This perceived difference in "shades" is more distinct if the absolute value of the difference is about 2 or more. Thus, if the comparative color scales (a*, b*) are (0, 5) and (0, 7), the difference between the yellow shades becomes more obvious to the observer. Therefore, if a first material is considered to have a color scale that differs from the corresponding color scale of a second material, the absolute value of the difference between the two corresponding color scales should be about 1 or more, and more preferably, about 2 or more. If the two materials are considered to have corresponding color scales that are approximately equal, the absolute value of the difference between the respective color scales should be less than about 2, or, more preferably, less than about 1.

The color, or L*, a*, and b* values, of the optical body are determined by the combination of the L*, a*, b* values (and the combined transmission spectra) of the polymeric core and the metallic layer. Thus, in order to tailor the color of the optical body, it is necessary to choose appropriate materials for the pigmented polymeric core and the metallic layer. For example, if the application requires a red hue, a neutral colored metal or alloy (with a* and b* values approaching zero) could be combined with a pigmented polymeric core having a positive a* value to produce a red tinted optical body. An increase in the absolute value of the a* color scale of the polymeric core will also provide increased saturation of red color in the resultant optical body.

Similarly, if the application requires a neutral color, a metal or alloy possessing a blue tint, or negative b* value, could be used with a pigmented polymeric core possessing a positive b* value to provide a neutral optical body. Although the appropriate relative absolute b* values would vary depending on the type metals, pigments, and polymers used (and the combined transmission spectra of the metallic layer and polymeric core), a good initial approximation is to set the absolute value of the positive and negative b* approximately equal. Preferably, the absolute values should differ by about 2 or less, and more preferably by about 1 or less. Once materials are chosen to obtain approximately equal absolute values, a series of relatively easy trial and error procedures can be performed to obtain the targeted color. Variations in, for example, pigment particulate size, pigment concentration, and metal thickness can be made in order to produce the optimum color in the resultant optical body.

As an alternative to the above trial and error procedure, it is possible to determine the appropriate L*, a*, b* absolute values of the metallic layer and polymeric core in order to obtain the desired L*, a*, b* values of the optical body by using the calculations described in ASTM E308. For example, if a given L*, a*, and b* combination is desired in the optical body, the transmission spectrum that corresponds to these color scale values in the visible region can be calculated. Then, individual transmission spectra of various polymeric core and metallic layer configurations can be compared to select the material combinations that will give the desired combined transmission spectrum. The final transmission spectrum of the optical body will often be obtained by combining a metallic layer having a transmission spectrum that differs from the transmission spectrum of the polymeric core within the visible spectrum. In preferred embodiments, the transmission spectrum of the optical body within the visible spectrum will also differ from both the transmission spectrum of the metallic layer and the transmission spectrum of the polymeric core within the visible region.

An appreciable difference in transmission spectra is generally one that can be perceived by the human eye. In order for the human eye to perceive a difference or change in transmission (which is usually perceptible as a change in color), the difference in transmission should be at least about 2 percent at one or more wavelengths within the visible region. This value of perceptible percent difference will vary, however, with the wavelength of the interest within the visible spectrum and the sensitivity of the observer.

Since transmission is generally determined as a function of the wavelength of incident light, the transmission of a given material will often vary within the visible spectrum. Because of this potential variation, it is possible for the transmission spectra of two different materials to differ across the entire visible region, or to differ only at certain discrete wavelengths or wavelength bands within the visible spectrum. Therefore, depending on the intended application, it may also be desirable to design optical bodies where the transmission spectra of the metallic layer and polymeric core differ primarily within a narrower wavelength band (or bands) of interest within the visible spectrum. Similarly, in certain applications, the transmission spectrum of the optical body may differ from both the transmission spectrum of the metallic layer and the transmission spectrum of the polymeric core within a wavelength band (or bands) of interest within the visible region.

The wavelength bands of interest can vary depending on the types of metals, pigments, and polymers used to construct the optical body, as well as the intended application. For example, in constructing optical bodies for use with fluorescent light, it may be desirable to combine metallic layers and polymeric cores that are particularly complimentary within the wavelength bands corresponding to fluorescent light. Typically, fluorescent light is comprised of the following discrete wavelength bands within the visible spectrum: about 400–410 nm, about 430–440 nm, about 530–555 nm, and about 605–635 nm. In designing the optical body to obtain the desired "color" in fluorescent light, transmission spectra of various metallic layer and polymeric core configurations can be compared in the aforementioned wavelength bands, rather than across the entire visible spectrum.

In addition to comparing differences between and among the transmission spectra of the metallic layer, polymeric core, and optical body within a wavelength band (or bands) of interest, comparisons using the average transmission of the material within the visible spectrum may also be useful. In some embodiments, it may be desirable for the average transmission of the metallic layer to differ from that of the polymeric core. Similarly, in other embodiments, the average transmission of the optical body will differ from both the average transmission of the metallic layer and the average transmission of the polymeric core within the visible spectrum.

One non-limiting example of a particularly useful application of this invention is the production of neutral or gray tinted film using carbon black particulate and an aluminum surface layer. Carbon black pigmented polymeric cores tend to be slightly yellow in transmission, which translates into a positive b* value. Aluminum, on the other hand, has a blue hue, or negative b* value, which is an appropriate compliment to the carbon black. Thus, certain carbon black loadings in the polymeric core can be combined with an aluminum layer of an appropriate thickness to produce a neutral or gray color. The preferred thickness of the aluminum layer will vary depending on the transmission of the film and the concentration of the carbon black. As the carbon black concentration in the film increases and the transmission level decreases, the saturation of yellow increases. At these higher concentrations, it is necessary to use a thicker aluminum layer to obtain the neutral color. A thicker aluminum layer, however, can increase the reflectivity of the optical body. If a higher level of reflectivity is undesirable for certain applications, other pigments, such as indanthrone, copper phtalocyanine, and cobalt aluminate can be used in combination with the carbon black to decrease the b* value of the polymeric core.

The above examples in no way exhaust the numerous combinations that can be used to produce tailorable color in the optical bodies. Other useful combinations include optical bodies wherein: at least one of the L*, a*, b* values of the metallic layer differs from the corresponding L*, a*, and b* values of the pigmented polymeric core; at least one of the a* and b* values of the metallic layer differs from the corresponding a* and b* values of the pigmented polymeric core; and at least one of the a* and b* values of the metallic layer is of the same sign as the corresponding a* and b* values of the polymeric core.

Color changes in and the neutrality of optical bodies can also be determined using the Standard Test Method for Calculation of Color Differences from Instrumentally Measured Color Coordinates described in ASTM D2244. The following equation described in ASTM D2244 can be used to determine the relative color differences between two optical bodies:

$$\Delta E = [(\Delta L^*)^2 + (\Delta a^*)^2 + (\Delta b^*)^2]^{1/2}$$

wherein $\Delta E$ is the color difference between the two optical bodies being compared, and $\Delta L^*$, $\Delta a^*$, and $\Delta b^*$ are the differences in the color scales of the two optical bodies being compared. The human eye can generally perceive a color change between the two optical bodies being compared when the $\Delta E$ value is about 3 or more, and, more preferably, about 5 or more. These values of color difference will vary, however, depending on the sensitivity of the observer.

The method described in ASTM D2244 can also be used to determine the neutrality of the optical body relative to a neutral control. For example, if an optical body of interest with given L*, a*, and b* color scales is compared to a control having the same L* value as the optical body, but a* and b* values of zero, the color difference, $\Delta E$, between the optical body and control is a measure of the optical body's neutrality. If the color difference, $\Delta E$, is less than about 5, and, more preferably, less than about 3, the optical body will appear as neutral or gray in color to an observer.

In addition to tailoring color, the optical body can also be designed to provide specific transmission, reflectivity, and absorption within the visible spectrum depending on the desired application. Manipulating the pigment in the polymeric core and the metallic layer can control each of these optical properties. For example, variations in metal, pigment, and polymer type can affect the transmission of the optical body within the visible spectrum. The metallic layer thickness, pigment concentration, and pigment particle size also affect transmission. An increase in the thickness of the metallic layer, an increase in the concentration (weight percent) of the pigment, or a decrease in particle size of the pigment will reduce the transmission of the resultant optical body. The decrease in particle size creates greater surface area at a given concentration (weight percent), which reduces overall transmission of the optical body. In most applications, the desirable transmission will range from about 1 to about 95 percent, and, more preferably, from about 5 to about 90 percent.

Reflectivity and absorption can also be controlled by variations in the materials of the optical body. Reflectivity is predominately dependent on metal type and thickness. A change in the metal type (e.g. from Nickel to Aluminum) and an increase in the thickness of the metal layer can increase the reflectivity of the optical body. The ability to control reflectivity provides significant advantages in tailoring the aesthetic appearance and functional properties of the optical body. For example, high reflectivity (usually greater than about 25 percent) can impart a mirror-like appearance that may be aesthetically desirable or undesirable depending on the end-use. In addition, a certain amount of reflectivity can improve the "heat-up" properties of the optical body. When the reflectivity increases, this generally causes a reduction in the amount of light absorbed by the optical body. This reduction in absorption reduces the amount of energy available to "heat-up" or raise the temperature of the optical body. In certain applications, "heat-up" of the optical body can be detrimental. For example, if the optical body is used as a film to tint glass, increases in the temperature of the optical body can cause the glass substrate to fracture or crack. This increase in temperature, and thus damage to the glass substrate, can be avoided with an increase in the optical body's reflectivity for any given transmission.

Haze of the Optical Body

Preferred optical bodies or polymeric cores may also possess relatively low haze. A useful measure of the "haze" of an optical body can be determined from the percentage of light which, in passing through the body, deviates from the incident beam through forward scatter by more than a specified average degree. ASTM D1003 provides one method for making such a measurement. When the haze of an optical body or polymeric core is determined against light scattering about the surface of the body exposed to air, the measured haze includes the haze caused by both surface and internal optical effects. This is considered the "total" haze for the optical body. The optical effects generated by the body itself internally, or "internal" haze, can be determined by measuring the haze of the optical body or polymeric core when it is immersed in a fluid of substantially similar refractive index. Generally, the optical bodies or polymeric cores of the invention will exhibit an internal haze of less than about five percent, preferable less than about three percent, and more preferably less than about two percent. Preferred optical bodies or polymeric cores will also exhibit a total haze of less than about ten percent, more preferable less than about five percent.

Applications

The optical bodies of the invention can be used in any application to provide a neutral or colored tint or density filter. The optical bodies can incorporate or be applied to other optical bodies or films to combine multiple optical effects. For example, the optical bodies can be incorporated along with one or more additional optically active layers to form an IR mirror, UV absorption construction, solar control construction, polarizer, or decorative construction. Similarly, the pigmented optical bodies of the invention can be used to tint automotive or window glazings, such as glass or polycarbonates. The pigmented optical bodies also find application in the construction of puncture or tear-resistant films, safety and security films, and as contrast enhancement layers for optical displays, for example, computer monitors, television screens, and the like.

DETAILED DESCRIPTION OF THE DRAWINGS

FIG. 1 is a graph 100 of percent transmission or reflection as a function of wavelength. The graph plots the transmission of the polymeric core 102, metallic layer 104, and optical body 106, and the reflection of the optical body 108 as a function of the wavelength of light across the visible spectrum. The optical body in this figure was made according to the Polymeric Core Process A1 and the Metallic Layer Process C described in connection with example 3 in the examples set forth below. The polymeric core comprises polyethylene terephthalate and carbon black. The metallic layer comprises aluminum with a coating thickness of 7.0 nm. The L*, a*, and b* color scales of the metallic layer are 72.63, −1.34, and −6.12, respectively. The L*, a*, and b* color scales of the polymeric core are 86.22, 0.40, and 3.33 respectively. Therefore, at least one of the color scales of the metallic layer differs from the corresponding color scales of the polymeric core.

A comparison of the percent transmission in Figure 1 of the optical body, metallic layer, and polymeric core at one or more given wavelengths can be used to show that the transmission spectrum of the optical body differs from both the transmission spectrum of the metallic layer and the transmission spectrum polymeric core within the visible region. For example, at the 500 nm wavelength the percent transmission of the optical body, metallic layer, and polymeric core are about 38 percent, 48 percent, and 67 percent respectively. Because the percent transmission of the optical body differs from the percent transmission of both the metallic layer and polymeric core at one or more wavelengths within the visible spectrum, the transmission spectrum of the optical body 106 differs from the transmission spectra of both the metallic layer 104 and the polymeric core 102 within the visible spectrum. Additionally, because the percent transmission of the metallic layer and polymeric core also differ at 500 nm, the transmission spectrum of the metallic layer differs from the transmission spectrum of polymeric core within the visible spectrum.

By comparing the transmission spectra of the optical body, metallic layer, and polymeric core at one or more wavelengths within a defined wavelength band of interest, it can be also determined whether the transmission spectra differ within the wavelength band of interest. For example, if the wavelength band of interest is defined as ranging from 475 nm to 525 nm, a comparison of the percent transmission at the 500 nm wavelength in FIG. 1 shows that the transmission spectrum of the optical body differs from both the transmission spectrum of the metallic layer and transmission spectrum of the polymeric core within this wavelength band of interest. Similarly, the transmission spectra of the metallic layer and polymeric core also differ within this wavelength band of interest.

The data generated from FIG. 1 (see example 3 below) also reveals that the average transmission of the optical body, metallic layer, and polymeric core differ within the visible spectrum. The average transmission of the optical body, metallic layer, and polymeric core within the visible spectrum are 37.8 percent, 44.2 percent, and 70.5 percent, respectively. Therefore, the average transmission of the optical body differs from the average transmission of both the metallic layer and polymeric core, and the average transmission of the metallic layer differs from the average transmission of the polymeric core.

Figure 2:
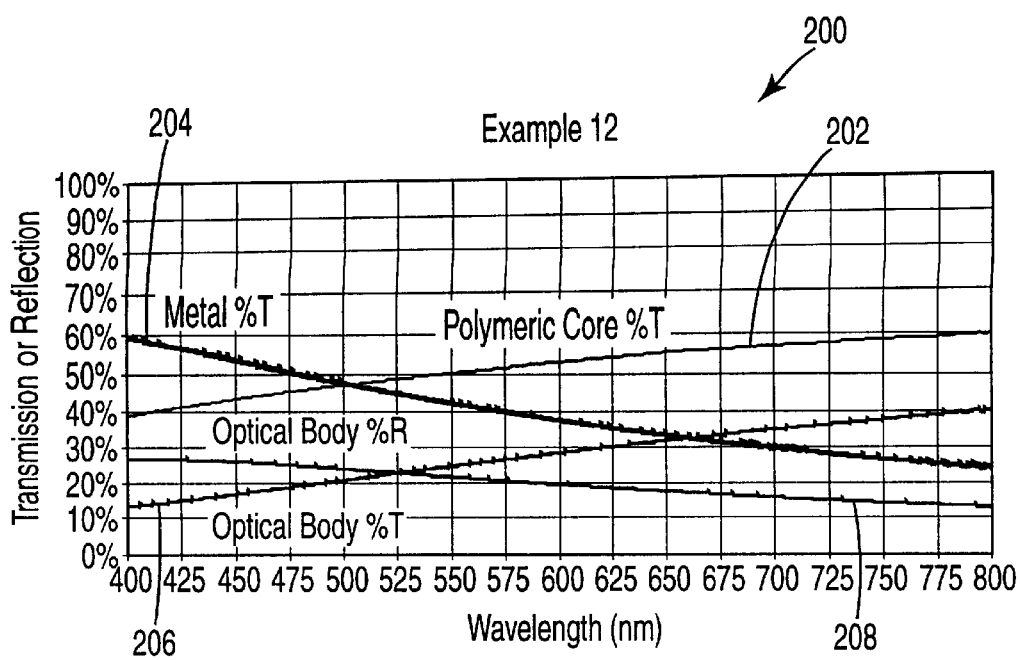
FIG. 2 is a graph of the reflection and transmission spectra of an optical body for one embodiment of the invention, wherein the metallic layer is comprised of silver and the polymeric core is comprised of polyethylene terephthalate and carbon black.

FIG. 2 is a graph 200 of percent transmission or reflection as a function of wavelength. The graph plots the transmission of the polymeric core 202, metallic layer 204, and optical body 206, and the reflection of the optical body 208 as a function of the wavelength of light across the visible spectrum. The optical body in this figure was made according to the Polymeric Core Process A2 and the Metallic Layer Process F described in connection with example 12 in the examples set forth below. The polymeric core comprises polyethylene terephthalate and carbon black. The metallic layer comprises silver with a coating thickness of 20 nm. The L*, a*, and b* color scales of the metallic layer are 70.62, −4.65, and −11.85, respectively. The L*, a*, and b* color scales of the polymeric core are 76.54, 0.72, and 6.39 respectively. Therefore, at least one of the color scales of the metallic layer differs from the corresponding color scales of the polymeric core.

By using similar comparisons as described in the context of FIG. 1, it can also be shown in FIG. 2 that the transmission spectrum of the optical body differs from both the transmission spectrum of the metallic layer and the transmission spectrum of the polymeric core within the visible spectrum and within various wavelength bands of interest within the visible spectrum. Similarly, the transmission spectrum of the metallic layer and the transmission spectrum of the polymeric core differ within the visible region and within various wavelength bands of interest within the visible regions.

The data generated from FIG. 2 (see example 12 below) also reveals that the average transmission of the optical body, metallic layer, and polymeric core differ within the visible spectrum. The average transmission of the optical body, metallic layer, and polymeric core within the visible spectrum are 19.8 percent, 40.3 percent, and 54.4 percent, respectively. Therefore, the average transmission of the optical body differs from the average transmission of both the metallic layer and polymeric core, and the average transmission of the metallic layer differs from the average transmission of the polymeric core.

Figure 3:
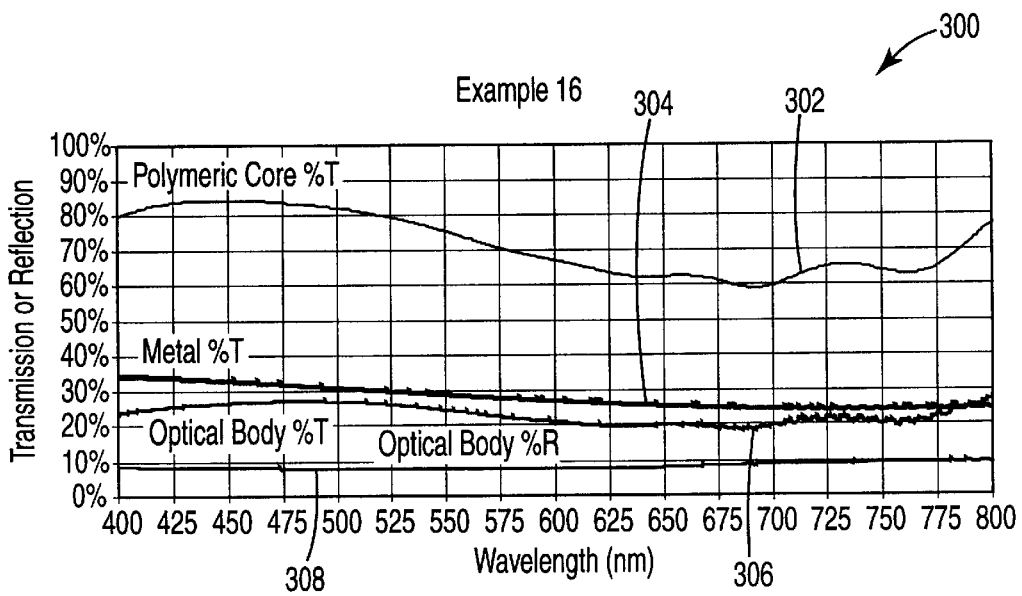
FIG. 3 is a graph of the reflection and transmission spectra of an optical body for one embodiment of the invention, wherein the metallic layer is comprised of aluminum and the polymeric core is comprised of polyethylene terephthalate and Pigment Blue 60.

FIG. 3 is a graph 300 of percent transmission or reflection as a function of wavelength. The graph plots the transmission of the polymeric core 302, metallic layer 304, and optical body 306, and the reflection of the optical body 308 as a function of the wavelength of light across the visible spectrum. The optical body in this figure was made according to the Polymeric Core Process B and the Metallic Layer Process D described in connection with example 16 in the examples set forth below. The polymeric core comprises polyethylene terephthalate and Pigment Blue 60. The metallic layer comprises aluminum with a coating thickness of 9.0 nm. The L*, a*, and b* color scales of the metallic layer are 60.51, −1.16, and −10.84, respectively. The L*, a*, and b* color scales of the polymeric core are 88.46, −5.34, and −9.11 respectively. Therefore, at least one of the color scales of the metallic layer differs from the corresponding color scales of the polymeric core.

By using similar comparisons as described in the context of FIG. 1, it can also be shown in FIG. 3 that the transmission spectrum of the optical body differs from both the transmission spectrum of the metallic layer and the transmission spectrum of the polymeric core within the visible spectrum and within various wavelength bands of interest within the visible spectrum. Similarly, the transmission spectrum of the metallic layer and the transmission spectrum of the polymeric core differ within the visible region and within various wavelength bands of interest within the visible regions.

The data generated from FIG. 3 (see example 16 below) also reveals that the average transmission of the optical body, metallic layer, and polymeric core differ within the visible spectrum. The average transmission of the optical body, metallic layer, and polymeric core within the visible spectrum are 23.5 percent, 28.7 percent, and 72.0 percent, respectively. Therefore, the average transmission of the optical body differs from the average transmission of both the metallic layer and polymeric core, and the average transmission of the metallic layer differs from the average transmission of the polymeric core.

Figure 4:
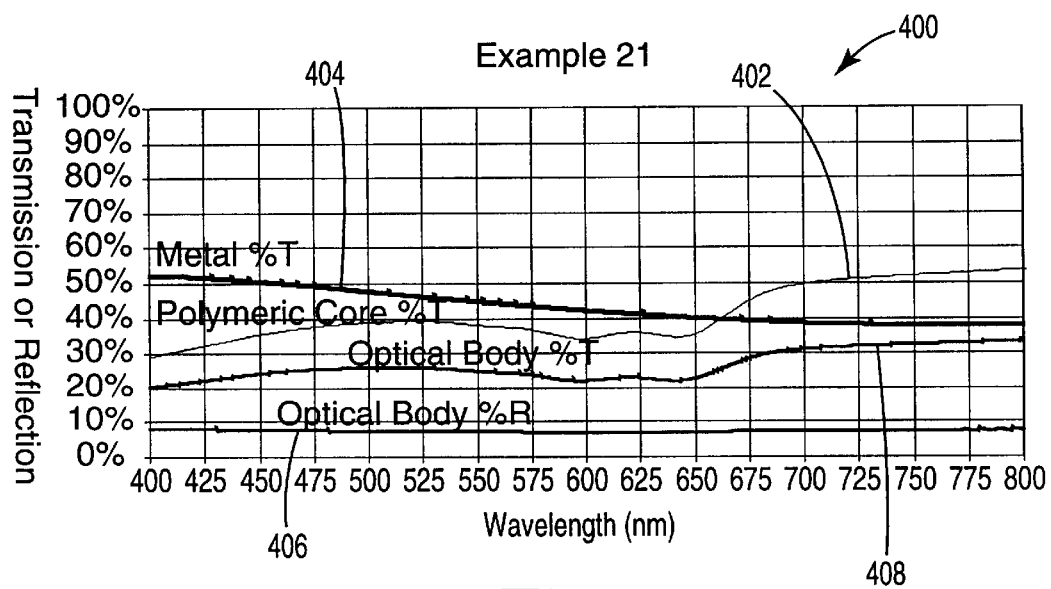
FIG. 4 is a graph of the reflection and transmission spectra of an optical body for one embodiment of the invention, wherein the metallic layer is comprised of aluminum and the polymeric core is comprised of polyethylene terephtalate, carbon black, and a blue Ceres XR-RF dye.

FIG. 4 is a graph 400 of percent transmission or reflection as a function of wavelength. The graph plots the transmission of the polymeric core 402, metallic layer 404, and optical body 406, and the reflection of the optical body 408 as a function of the wavelength of light across the visible spectrum. The optical body in this figure was made according to the Polymeric Core Process C1 and the Metallic Layer Process C described in connection with example 21 in the examples set forth below. The polymeric core comprises polyethylene terephthalate, carbon black, and blue Ceres XR-RF dye. The metallic layer comprises aluminum with a coating thickness of 7.0 nm. The L*, a*, and b* color scales of the metallic layer are 72.63, −1.34, and −6.12, respectively. The L*, a*, and b* color scales of the polymeric core are 67.46, −3.41, and 0.98 respectively. Therefore, at least one of the color scales of the metallic layer differs from the corresponding color scales of the polymeric core. The L*, a*, and b* color scales of the optical body represented in FIG. 4 are 56.39, −3.33, and −0.52, respectively. Because the a* and b* color scales are within the range of about −5 to 5 within the visible spectrum, the optical body will appear to have a neutral, or gray, color to an observer.

By using similar comparisons as described in the context of FIG. 1, it can also be shown in FIG. 4 that the transmission spectrum of the optical body differs from both the transmission spectrum of the metallic layer and the transmission spectrum of the polymeric core within the visible spectrum and within various wavelength bands of interest within the visible spectrum. Similarly, the transmission spectrum of the metallic layer and the transmission spectrum of the polymeric core differ within the visible region and within various wavelength bands of interest within the visible regions.

The data generated from FIG. 4 (see example 21 below) also reveals that the average transmission of the optical body, metallic layer, and polymeric core differ within the visible spectrum. The average transmission of the optical body, metallic layer, and polymeric core within the visible spectrum are 24.0 percent, 44.2 percent, and 38.0 percent, respectively. Therefore, the average transmission of the optical body differs from the average transmission of both the metallic layer and polymeric core, and the average transmission of the metallic layer differs from the average transmission of the polymeric core.

The following examples are offered to aid in the understanding of the present invention and are not to be construed as limiting the scope thereof. Unless otherwise indicated, all parts and percentages are by weight.

EXAMPLES

Examples 1–30 below are based on optical bodies constructed according to the various particle dispersion, masterbatch, polymeric core, and metallic layer processes described below. The tables below specify, for each example, the polymeric core and metallic layer processes used to construct the optical body. The tables also list the following: average transmission of the polymeric core, metallic layer, and optical body; average reflectivity of the optical body; haze of the optical body; and the a* and b* values of the polymeric core, metallic layer, and optical body. The transmission spectrum of the metallic layer, polymeric core, and optical body and the reflection spectrum of the optical body for examples 3, 12, 16, and 21 are shown in FIGS. 1–4, respectively.

Particle Dispersion A

In a 210 liter tank, 91.5% by weight of ethylene glycol and 3.5% by weight PVP (polyvinylpyrrolidone, specifically ISP PVP K15) wetting agent were intensively mixed for about 30 minutes using a high speed, high shear Cowles "Dissolver" mixer equipped with a 25 cm. diameter mixing blade. While continuing to mix, 5.0% by weight carbon black (Cabot Black Pearls 1300, which is said to have 13 nm particle size) were slowly added to the ethylene glycol mixture. After one-half hour at 1700 rpm, the mixture was pumped at 1 liter per minute through a high shear, (13 liter, Netzch horizontal) sand mill containing a 52%, by volume, loading of uniform 0.8–1.0 mm ceramic media and shaft rpm of 1460. The mixture was passed through the mill 7 times, 5 passes through the mill provided a uniform dispersion of carbon black particles. The dispersion was passed through a 1-micron cartridge filter (specifically Roki HT-10). The finished dispersion was held in a vessel equipped with low speed agitation from a Cowles Dissolver until ready for addition to the reactor. Analysis with Hegman Gauge and light microscopy indicated that the dispersion was free of agglomerations larger than 1 micron, Microtrac™ particle analyzer indicated that the volume fraction average particle/agglomerate size in the dispersion was about 150 nm Particle Dispersion B In a 210 liter tank, 84.37% by weight of ethylene glycol and 1.18% by weight PVP (polyvinylpyrrolidone) wetting agent were intensively mixed for about 30 minutes using a high speed, high shear Cowles "Dissolver" mixer equipped with a 25 cm. diameter mixing blade. While continuing to mix, 14.44% by weight Pigment Blue 60 (specifically BASF Paliogen® Blue L6495F which has a specific surface area of about 80 m²/g) was slowly added to the ethylene glycol mixture. After one-half hour at 1700 rpm, the mixture was pumped at 1 liter per minute through a high shear, (13 liter, Netzch horizontal) sand mill containing a 52%, by volume, loading of uniform 4.75 mm stainless steel beads and shaft rpm of 1460. The mixture was passed through the mill 5 times. The dispersion was passed through a 5-micron cartridge filter. The filter effectively removed many of the larger pigment agglomerates reducing the pigment level of the final mixture to 10.73% by weight. The finished dispersion was held in a vessel equipped with low speed agitation from a Cowles Dissolver until ready for addition to the reactor. Analysis with Hegman Gauge and light microscopy indicated that the dispersion was mostly free of agglomerations larger than 1 micron, Microtrac™ particle analyzer indicated that the volume fraction average particle/agglomerate size in the dispersion was less than 900 nm.

Masterbatch A

Into a 380 liter reactor equipped with a turbine agitator and a hot oil jacket were charged 100 parts by weight of dimethyl terephthalate, 82.3 parts of ethylene glycol, 0.25 parts trimethylol propane, 0.025 parts cobalt acetate, 0.025 parts zinc acetate, and 0.03 parts antimony acetate. While agitating at a pressure of 138 kPa, the batch temperature was gradually raised to 249° C., while fractionating off 33 parts by weight of methanol. When the batch reached 255° C., over a period of ten minutes, the kettle pressure decreased to 101.3 kPa. The reactor was isolated and 0.039 parts triethyl phosphonoacetate was added and allowed to mix for five minutes. 40 parts of Particle Dispersion A were added and allowed to mix for ten minutes. The reactor contents were transferred to a 380-liter polymerization vessel equipped with an anchor agitator and a hot oil jacket, and the solution temperature was adjusted to 198° C. The solution temperature was increased to 260° C. at 0.6° C. per minute to remove excess ethylene glycol. At 260° C. the vessel pressure was reduced to 0.133 kPa or less over a 20-minute period while the solution temperature was raised to 285° C. The mixture polymerized under these conditions to an intrinsic viscosity of 0.61 in trifluoroacetic acid. It was drained from the reactor using nitrogen pressure through a strand die, quenched with room temperature water in a water bath, and cut into chips.

Masterbatch B

Into a 380 liter reactor equipped with a turbine agitator and a hot oil jacket were charged 100 parts by weight of dimethyl terephthalate, 70.32 parts of ethylene glycol, 0.125 parts trimethylol propane, 0.025 parts cobalt acetate, 0.025 parts zinc acetate, and 0.03 parts antimony acetate. While agitating at a pressure of 138 kPa, the batch temperature was gradually raised to 249° C., while fractionating off 33 parts by weight of methanol. When the batch reached 255° C., over a period of ten minutes, the kettle pressure decreased to 101.3 kPa. The reactor was isolated and 0.039 parts triethyl phosphonoacetate was added and allowed to mix for five minutes. 14.3 parts of Particle Dispersion B were added and allowed to mix for ten minutes. The reactor contents were transferred to a 380-liter polymerization vessel equipped with an anchor agitator and a hot oil jacket, and the solution temperature was adjusted to 198° C. The solution temperature was increased to 260° C. at 0.6° C. per minute to remove excess ethylene glycol. At 260° C. the vessel pressure was reduced to 0.133 kPa or less over a 20-minute period while the solution temperature was raised to 285° C. The mixture polymerized under these conditions to an intrinsic viscosity of 0.61 in trifluoroacetic acid. It was drained from the reactor using nitrogen pressure through a strand die, quenched with room temperature water in a water bath, and cut into chips.

Masterbatch C

Into a twin screw extruder is fed 97.75 parts of polyethylene terephthalate and 2.25 parts of blue dye (specifically Ceres XR-RF). These two components are intimately mixed in the extruder and exit through a strand dye to be cut into chips. This dyed PET has an intrinsic viscosity of 0.515 and a melting point of 241.6° C.

Polymeric Core Process A–A1 and A2

Into a first extruder was fed a blend ranging from 82.1 parts of polyethylene terephthalate and 17.8 parts of Masterbatch A to 93.3 parts of polyethylene terephthalate and 6.6 parts of Masterbatch A. (Polymeric Core Process A1 used 93.3 parts of polyethylene terephthalate and 6.6 parts of Masterbatch A. Polymeric Core Process A2 used 82.1 parts of polyethylene terephthalate and 17.8 parts of Masterbatch A.) Into a second extruder was fed 33 parts of polyethylene terephthalate (see table of examples). While heated to 277° C., the contents of both extruders were passed through 7 micrometer pleated metal filters. The two streams were simultaneously fed through a drop die to provide a single 2-layer polyester sheet, the first layer of which contained Masterbatch A and polyethylene terephthalate and the second layer of which contained polyethylene terephthalate. The first layer was about 0.23 mm in thickness, the second layer was about 0.077 mm in thickness, and the width of the 2-layer sheet was about 32.7 cm. After being quenched on a water-cooled casting roll, the sheet was biaxially oriented about 3.5 times in each direction and heat set at 232° C. to provide a film base about 0.025 mm in thickness.

Polymeric Core Process B

Into a first extruder was fed a blend of 81 parts polyethylene terephthalate and 19 parts of Masterbatch B. Into a second extruder were fed 81.4 parts of polyethylene terephthalate (see table of examples). While heated to 277° C., the contents of both extruders were passed through 7 micrometer pleated metal filters. The two streams were simultaneously fed through a drop die to provide a single 2-layer polyester sheet, the first layer of which contained Masterbatch B and polyethylene terephthalate and the second layer of which contained polyethylene terephthalate. The first layer was about 0.138 mm in thickness, the second layer was about 0.169 mm in thickness, and the width of the 2-layer sheet was about 32.7 cm. After being quenched on a water-cooled casting roll, the sheet was biaxially oriented about 3.5 times in each direction and heat set at 232° C. to provide a film base about 0.025 mm in thickness.

Polymeric Core Process C–C1 and C2

Into a first extruder was fed a blend ranging from 64.4 parts of polyethylene terephthalate, 24.5 parts of Masterbatch A, and 11.1 parts Masterbatch C to 75.9 parts of polyethylene terephthalate, 17.7 parts Masterbatch A, and 6.3 parts of Masterbatch C. (Polymeric Core Process C1 used 64.4 parts of polyethylene terephthalate, 24.5 parts of Masterbatch A, and 11.1 parts Masterbatch C. Polymeric Core Process C2 used 75.9 parts of polyethylene terephthalate, 17.7 parts Masterbatch A, and 6.3 parts of Masterbatch C.) Into a second extruder were fed 81.3 parts of polyethylene terephthalate (see table of examples). While heated to 277° C., the contents of both extruders were passed through 7 micrometer pleated metal filters. The two streams were simultaneously fed through a drop die to provide a single 2-layer polyester sheet, the first layer of which contained Masterbatch A, Masterbatch C, and polyethylene terephthalate and the second layer of which contained polyethylene terephthalate. The first layer was about 0.137 mm in thickness, the second layer was about 0.17 mm in thickness, and the width of the 2-layer sheet was about 32.7 cm. After being quenched on a water-cooled casting roll, the sheet was biaxially oriented about 3.5 times in each direction and heat set at 232° C. to provide a film base about 0.025 mm in thickness.

Metallic Layer Process A

Aluminum was coated in a planetary-fixtured box coater onto the 21.59 cm×27.94 cm polymer substrates. No surface treatment was used on the substrates and all were coated during a single pumpdown. Aluminum was deposited from an e-beam source at a rate of 0.5 nm/sec and a pressure of $8.7 \times 10^{-6}$ torr. The coating thickness was 3.5 nm (measured crystal thickness/tooling factor is 46%) and the transmission at 550 nm was 61% after removed from the coating chamber. After subsequent atmospheric oxidation of the metal occurred, the transmission of the metal layer increased to about 80%T.

Metallic Layer Process B

Aluminum was coated in a planetary-fixtured box coater onto the 21.59 cm×27.94 cm polymer substrates containing varying pigment and dye loadings. No surface treatment was used on the substrates and all were coated during a single pumpdown. Aluminum was deposited from an e-beam source at a rate of 0.5 nm/sec and a pressure of $7.0 \times 10^{-6}$ torr. The coating thickness was 7.0 nm (measured crystal thickness/tooling factor is 48%) and the transmission at 550 nm was 41% after removed from the coating chamber. After subsequent atmospheric oxidation of the metal occurred, the transmission of the metal layer increased to about 60%T.

Metallic Layer Process C

Aluminum was coated in a planetary-fixtured box coater onto the 21.59 cm×27.94 cm polymer substrates containing varying pigment and dye loadings. No surface treatment was used on the substrates and all were coated during a single pumpdown. Aluminum was deposited from an e-beam source at a rate of 1.0 nm/sec and a pressure of $8.8 \times 10^{-6}$ torr. The coating thickness was 7.0 nm (measured crystal thickness/tooling factor is 37%) and the transmission at 550 nm was 34.8% after removed from the coating chamber. After subsequent atmospheric oxidation of the metal occurred, the transmission of the metal layer increased to about 44%T.

Metallic Layer Process D

Aluminum was coated in a planetary-fixtured box coater onto the 21.59 cm×27.94 cm polymer substrates containing varying pigment and die loadings. No surface treatment was used on the substrates and all were coated during a single pumpdown. Aluminum was deposited from an e-beam source at a rate of 1.2 nm/sec and a pressure of $7.5 \times 10^{-6}$ torr. The coating thickness was 9.0 nm (measured crystal thickness/tooling factor is 35%) and the transmission at 550 nm was 23.5% after removed from the coating chamber. After subsequent atmospheric oxidation of the metal occurred, the transmission of the metal layer increased to about 24%T.

Metallic Layer Process E

Silver was coated in a planetary-fixtured box coater onto the 21.59 cm×27.94 cm polymer substrates containing varying pigment and die loadings. A 10 min. oxygen plasma treatment was used on the substrates and all were coated during a single pumpdown. Tie layer of Copper was deposited from an e-beam source at a rate of 0.1 nm/sec and a pressure of $3.7 \times 10^{-6}$ torr. The coating thickness was 2.0 nm (measured crystal thickness/tooling factor is 68%). Silver was deposited from an e-beam source at a rate of 0.7nm/sec and a pressure of $2.4 \times 10^{-6}$ torr. The coating thickness was 10 nm (measured crystal thickness/tooling factor is 99%) and the transmission at 550 nm was 68.8% after removed from the coating chamber.

Metallic Layer Process F

Silver was coated in a planetary-fixtured box coater onto the 21.59 cm×27.94 cm polymer substrates containing varying pigment and die loadings. No surface treatment was used on the substrates and all were coated during a single pumpdown. Silver was deposited from an e-beam source at a rate of 1.3nm/sec and a pressure of $2.2 \times 10^6$ torr. The coating thickness was 20 nm (measured crystal thickness/tooling factor is 90%) and the transmission at 550 nm was 34% after removed from the coating chamber.

Testing Methods

A BYK Gardner Hazegard™ Plus (Cat. No 4725) System were used according to ASTM D1003 to measure total haze. Total haze is the "percent of total transmitted light which, in passing through the specimen deviated from the incident beam through forward scatter by more than 0.044 rad (2.5°) on average.

Caliper for the substrate was measured with the Measuretech series 2000 capacitance thickness gauge.

Percent transmission and percent reflection was measured by a spectrophotometer and integrated over the visible spectrum, 360–760 nm. The reflection and transmission levels are measured from film side of the construction.

$L^*$, $a^*$, and $b^*$ color scales and related optical properties were calculated using the methods set forth in ASTM E308 and E1164.

Examples 1–12

Examples 1–12 in Table 1A and 1B were produced by Polymeric Core Process A1 or Polymeric Core Process A2.

TABLE 1A

| Example | Polymeric Core Process | Metallic Layer Process | Average Transmission of Polymeric Core (%) | Average Transmission of Metallic Layer (%) | Average Transmission of Optical Body (%) | Average Reflectivity of Optical Body (%) |
|---|---|---|---|---|---|---|
| 1 | A1 | A | 70.5 | 80.3 | 67.8 | 10.0 |
| 2 | A1 | B | 70.5 | 69.7 | 52.3 | 7.7 |
| 3 | A1 | C | 70.5 | 44.2 | 37.8 | 23.8 |
| 4 | A1 | D | 70.5 | 28.7 | 28.6 | 22.2 |
| 5 | A1 | E | 70.5 | 70.4 | 55.3 | 11.4 |
| 6 | A1 | F | 70.5 | 40.3 | 27.5 | 42.9 |
| 7 | A2 | A | 54.4 | 80.3 | 50.3 | 8.2 |
| 8 | A2 | B | 54.4 | 69.7 | 43.3 | 8.2 |
| 9 | A2 | C | 54.4 | 44.2 | 25.7 | 8.5 |
| 10 | A2 | D | 54.4 | 28.7 | 12.0 | 25.2 |
| 11 | A2 | E | 54.4 | 70.4 | 42.0 | 10.3 |
| 12 | A2 | F | 54.4 | 40.3 | 19.8 | 29.8 |

TABLE 1B

| Example | Total Haze of Optical Body (%) | Polymeric Core a* | Polymeric Core b* | Metallic Layer a* | Metallic Layer b* | Optical Body a* | Optical Body b* |
|---|---|---|---|---|---|---|---|
| 1 | 1.02 | 0.40 | 3.33 | 0.23 | 1.83 | 0.05 | 4.45 |
| 2 | 1.20 | 0.40 | 3.33 | -0.06 | 1.42 | 0.24 | 4.63 |
| 3 | 1.28 | 0.40 | 3.33 | -1.34 | -6.12 | -0.79 | -0.77 |
| 4 | 1.79 | 0.40 | 3.33 | -1.16 | -10.84 | -1.48 | -6.20 |
| 5 | 1.63 | 0.40 | 3.33 | -0.84 | -1.45 | -0.80 | 1.90 |
| 6 | 1.70 | 0.40 | 3.33 | -4.65 | -11.85 | -1.40 | -10.84 |
| 7 | 2.00 | 0.72 | 6.39 | 0.23 | 1.83 | 0.91 | 0.91 |
| 8 | 2.33 | 0.72 | 6.39 | -0.06 | 1.42 | 0.65 | 0.65 |
| 9 | 2.33 | 0.72 | 6.39 | -1.34 | -6.12 | -0.54 | -0.54 |
| 10 | 5.29 | 0.72 | 6.39 | -1.16 | -10.84 | -1.06 | -1.06 |
| 11 | 2.40 | 0.72 | 6.39 | -0.84 | -1.45 | 0.07 | 0.07 |
| 12 | 3.43 | 0.72 | 6.39 | -4.65 | -11.85 | -1.84 | -1.84 |

Examples 13–18

Examples 13–18 in Table 2A and 2B were produced by Polymeric Core Process B.

TABLE 2A

| Example | Metallic Layer Process | Average Transmission of Polymeric Core (%) | Average Transmission of Metallic Layer (%) | Average Transmission of Optical Body (%) | Average Reflectivity of Optical Body (%) | Total Haze of Optical Body (%) |
|---|---|---|---|---|---|---|
| 13 | A | 72.0 | 80.3 | 63.9 | 9.5 | 1.16 |
| 14 | B | 72.0 | 69.7 | 57.4 | 8.7 | 2.18 |
| 15 | C | 72.0 | 44.2 | 43.7 | 9.6 | 1.41 |
| 16 | D | 72.0 | 28.7 | 23.5 | 7.8 | 2.55 |
| 17 | E | 72.0 | 70.4 | 58.2 | 11.4 | 1.34 |
| 18 | F | 72.0 | 40.3 | 31.5 | 43.4 | 2.67 |

TABLE 2B

| Example | Polymeric Core a* | Polymeric Core b* | Metallic Layer a* | Metallic Layer b* | Optical Body a* | Optical Body b* |
|---|---|---|---|---|---|---|
| 13 | -5.34 | -9.11 | 0.23 | 1.83 | -5.13 | -7.20 |
| 14 | -5.34 | -9.11 | -0.06 | 1.42 | -7.44 | -7.06 |
| 15 | -5.34 | -9.11 | -1.34 | -6.12 | -4.50 | -10.32 |
| 16 | -5.34 | -9.11 | -1.16 | -10.84 | -4.41 | -16.07 |
| 17 | -5.34 | -9.11 | -0.84 | -1.45 | -4.67 | -4.67 |
| 18 | -5.34 | -9.11 | -4.65 | -11.85 | -4.65 | -4.65 |

Examples 19–30

Examples 19–24 in Tables 3A and 3B were produced by Polymeric Core Process C1 or Polymeric Core Process C2.

TABLE 3A

| Example | Polymeric Core Process | Metallic Layer Process | Average Transmission of Polymeric Core (%) | Average Transmission of Metallic Layer (%) | Average Transmission of Optical Body (%) | Average Reflectivity of Optical Body (%) |
|---|---|---|---|---|---|---|
| 19 | C1 | A | 38.0 | 80.3 | 29.9 | 7.1 |
| 20 | C1 | B | 38.0 | 69.7 | 30.2 | 8.0 |
| 21 | C1 | C | 38.0 | 44.2 | 24.0 | 13.3 |
| 22 | C1 | D | 38.0 | 28.7 | 14.1 | 14.2 |
| 23 | C1 | E | 38.0 | 70.4 | 29.3 | 9.0 |
| 24 | C1 | F | 38.0 | 40.3 | 16.1 | |
| 25 | C2 | A | 48.4 | 80.3 | 42.5 | 8.0 |
| 26 | C2 | B | 48.4 | 69.7 | 37.2 | 8.1 |
| 27 | C2 | C | 48.4 | 44.2 | 29.6 | 12.9 |
| 28 | C2 | D | 48.4 | 28.7 | 12.9 | 20.1 |
| 29 | C2 | E | 48.4 | 70.4 | 38.2 | 9.7 |
| 30 | C2 | F | 48.4 | 40.3 | 19.6 | 23.3 |

TABLE 3B

| Example | Total Haze of Optical Body (%) | Polymeric Core a* | Polymeric Core b* | Metallic Layer a* | Metallic Layer b* | Optical Body a* | Optical Body b* |
|---|---|---|---|---|---|---|---|
| 19 | 2.75 | −3.41 | 0.98 | 0.23 | 1.83 | −2.89 | 2.00 |
| 20 | 2.88 | −3.41 | 0.98 | −0.06 | 1.42 | −2.96 | 2.46 |
| 21 | 2.95 | −3.41 | 0.98 | −1.34 | −6.12 | −3.33 | −0.52 |
| 22 | 4.13 | −3.41 | 0.98 | −1.16 | −10.84 | −3.87 | −6.96 |
| 23 | 2.88 | −3.41 | 0.98 | −0.84 | −1.45 | −3.83 | −0.54 |
| 24 | 3.94 | −3.41 | 0.98 | −4.65 | −11.85 | −4.42 | −9.59 |
| 25 | 2.08 | −1.84 | 2.16 | 0.23 | 1.83 | −1.56 | 3.54 |
| 26 | 2.35 | −1.84 | 2.16 | −0.06 | 1.42 | −1.61 | 3.75 |
| 27 | 2.53 | −1.84 | 2.16 | −1.34 | −6.12 | −2.16 | −0.75 |
| 28 | 4.64 | −1.84 | 2.16 | −1.16 | −10.84 | −2.54 | −8.13 |
| 29 | 2.17 | −1.84 | 2.16 | −0.84 | −1.45 | −2.50 | 0.43 |
| 30 | 2.88 | −1.84 | 2.16 | −4.65 | −11.85 | −3.50 | −9.71 |

The present invention should not be considered limited to the particular examples described above, but rather should be understood to cover all aspects of the invention fairly set out in the attached claims. Various modifications, equivalent processes, as well as numerous structures to which the present invention may be applicable will be readily apparent to those of skill in the art to which the present invention is directed upon review of the present specification. The claims are intended to covers such modifications and devices.

What is claimed is:

1. An optical body comprising:
    a single or multiple layer polymeric core comprising at least one oriented layer of a thermoplastic polymer material having dispersed therein a particulate pigment, and
    a metallic layer located on at least one outer surface of the polymeric core, the metallic layer having a transmission in the visible region of 1 to 90 percent.

2. The optical body of claim 1, wherein the optical body exhibits a transmission of light within a wavelength band of interest within the visible spectrum of from about 5 to about 90 percent.

3. The optical body of claim 1, wherein the average reflectivity of the optical body is about 25 percent or less within the visible region.

4. The optical body of claim 1, wherein the average reflectivity of the optical body is greater than 25 percent within the visible region.

5. The optical body of claim 1, further comprising at least one additional layer that is substantially free of particulate pigmentation.

6. The optical body of claim 5, wherein the additional layer is located intermediate to the polymeric core and the metallic layer.

7. The optical body of claim 5, wherein the additional layer is located on at least one outer surface of the polymeric core.

8. The optical body of claim 5, wherein the additional layer is located on at least one outer surface of the metallic layer.

9. The optical body of claim 5, wherein the additional layer is a transparent coating, laminate, or film.

10. The optical body of claim 5, wherein the additional layer comprises an oriented film.

11. The optical body of claim 5, wherein the additional layer comprises a multilayer optical film.

12. The optical body of claim 1 further comprising at least one additional layer of a thermoplastic polymer material having dispersed therein a particulate pigment, such that said metallic layer is located intermediate the polymeric core and the additional layer.

13. The optical body of claim 1 wherein the optical body exhibits a total haze of less than about ten percent.

14. The optical body of claim 1 wherein the optical body exhibits a total haze of less than about five percent.

15. The optical body of claim 1, wherein the optical body exhibits an internal haze of less than about five percent.

16. The optical body of claim 1, wherein the optical body exhibits an internal haze of less than about three percent.

17. The optical body of claim 1, wherein the particulate pigment comprises carbon black.

18. The optical body of claim 1, wherein the metallic layer comprises aluminum, silver, gold, copper, nickel, titanium, iron, stainless steel, platinum, tin, lead, chromium, or inconel, or combinations thereof.

19. The optical body of claim 1, wherein the metallic layer comprises a multilayered structure comprising metals, metal-oxides, or alloys.

20. The optical body of claim 1, wherein the metallic layer comprises aluminum, and wherein the thickness of the metallic layer is between about 0.5 nm and about 29 nm.

21. The optical body of claim 1, wherein the metallic layer comprises silver, and wherein the thickness of the metallic layer is between about 2 nm and about 69 nm.

22. The optical body of claim 1, wherein the metallic layer comprises nickel, and wherein the thickness of the metallic layer is between about 0.5 nm and about 52 nm.

23. The optical body of claim 1, wherein the particulate pigment comprises a material selected from the group consisting of iron oxides, ammonium ferrocyanides, titanium dioxides, antimony oxides, zirconium oxides, zirconium silicates, zinc oxides, zinc sulfides, barium sulfates, calcium carbonates, calcium sulfates, cadmium sulfides, cadmium selenides, lead sulfates, chromium oxides, chromates, molybdates, manganates, silica, silicates, aluminosilicates, sodium alumino sulphosilicates, Pigment Blue 28, Cobalt Blue, Cobalt Aluminate, King's Blue, Thenard's Blue, Cadmium Red, Molybdate Orange, Lead Molybdate, Chrome Yellow, Lead Chromates, Chrome Green, Pigment Yellow 53, Titanium Yellow, Nickel Titanate, Nickel Antimony Titanate, Nickel Titanate Yellow, Pigment Violet 16, Manganese Violet, Permanent Violet, Nuremberg Violet, Mineral Violet, Fast Violet, phthalocyanines, copper phthalocyanines, quinacridones, anthraquinones, perylenes, perinones, dioxazines, diketo-pyrrolo-pyrrols (DPPs), indanthrones, benzidines, isoindolines and isoindolinones, benzimidazolones, azo pigments, disazo pigments, polyazo pigments, metallized azo pigments, and blends or mixtures thereof.

24. The optical body of claim 1, wherein the particulate pigment is between about 0.01 and about 1.0 percent by weight of the polymeric core, and wherein the particulate pigment has a mean diameter of between about 10 nm and about 500 nm.

25. The optical body of claim 1, wherein the thermoplastic polymer material comprises a condensation polymer.

26. The optical body of claim 1, wherein the thermoplastic polymer material comprises a polyester.

27. The optical body of claim 1, wherein the thermoplastic polymer material comprises a polyester comprising terephthalate monomer units.

28. The optical body of claim 1, wherein the thermoplastic polymer material comprises a polyester comprising naphthalate monomer units.

29. The optical body of claim 1, wherein the thermoplastic polymer material comprises a polyester selected from the group consisting of polyethylene naphthalate, polyethylene terephthalate, polycarbonates, polyarylates, polybutylene naphthalate, polypropylene naphthalate, polybutylene terephthalate, polypropylene terephthalate, and blends and copolymers of any of the above with each other or with other polymers.

30. The optical body of claim 1, wherein the single or multiple layer core is oriented.

31. The optical body of claim 1, wherein the single or multiple layer core comprises a multilayer optical film.

32. An article comprising the optical body of claim 1.

33. A window glazing film comprising the optical body of claim 1.

34. An infrared mirror comprising the optical body of claim 1.

35. A puncture resistant film comprising the optical body of claim 1.

36. A solar control film comprising the optical body of claim 1.

37. A security film comprising the optical body of claim 1.

38. A contrast enhancement film comprising the optical body of claim 1.

39. A display device comprising an external viewing surface which is configured to comprise the contrast enhancement film of claim 38.

40. A display device comprising the optical body of claim 1.

41. A traffic sign comprising the optical body of claim 1.

42. An optical body comprising:
a single or multiple layer polymeric core comprising at least one oriented layer of a thermoplastic polymer material having dispersed therein a particulate pigment, and
a metallic layer located on at least one outer surface of the polymeric core, the metallic layer having a transmission in the visible region of 1 to 90 percent,
wherein the color scales of the metallic layer are $L^*_m$, $a^*_m$, and $b^*_m$,
wherein the color scales of the polymeric core are $L^*_p$, $a^*_p$, and $b^*_p$, and
wherein at least one of the $L^*_m$, $a^*_m$, and $b^*_m$ values differs from the corresponding $L^*_p$, $a^*_p$, and $b^*_p$ values within the visible spectrum.

43. The optical body of claim 42, wherein at least one of the $L^*_m$, $a^*_m$, and $b^*_m$ values differs from the corresponding $L^*_p$, $a^*_p$, and $b^*_p$ values by an absolute value of about 1 or more.

44. The optical body of claim 42, wherein at least one of the $L^*_m$, $a^*_m$, and $b^*_m$ values differs from the corresponding $L^*_p$, $a^*_p$, and $b^*_p$ values by an absolute value of about 2 or more.

45. The optical body of claim 42, wherein at least one of the $a^*_m$ and $b^*_m$ values differs from the corresponding $a^*_p$ and $b^*_p$ values.

46. The optical body of claim 42, wherein at least one of the $a^*_m$ and $b^*_m$ color scale values of the metallic layer is opposite in sign to the corresponding $a^*_p$ and $b^*_p$ color scale values.

47. The optical body of claim 46, wherein the corresponding color scale values of opposite sign have absolute values that are approximately equal.

48. The optical body of claim 42, wherein at least one of the $a^*_m$ and $b^*_m$ values is the same in sign as the corresponding $a^*_p$ and $b^*_p$ values.

49. An optical body comprising:
a single or multiple layer polymeric core comprising at least one oriented layer of a thermoplastic polymer material having dispersed therein a particulate pigment, and
a metallic layer located on at least one outer surface of the polymeric core, the metallic layer having a transmission in the visible region of 1 to 90 percent,
wherein the transmission spectrum of the metallic layer differs from the transmission spectrum of the polymeric core within the visible spectrum.

50. The optical body of claim 49, wherein the transmission spectrum of the metallic layer differs from the transmission spectrum of the polymeric core by about 2 percent or more at one or more wavelengths within the visible spectrum.

51. The optical body of claim 49, wherein the average transmission of the metallic layer within the visible spectrum differs from the average transmission of the polymeric core within the visible spectrum.

52. The optical body of claim 49, wherein the transmission spectrum of the metallic layer differs from the transmission spectrum of the polymeric core within a wavelength band of interest within the visible spectrum.

53. An optical body comprising:
a single or multiple layer polymeric core comprising at least one oriented layer of a thermoplastic polymer material having dispersed therein a particulate pigment, and
a metallic layer located on at least one outer surface of the polymeric core, the metallic layer having a transmission in the visible region of 1 to 90 percent,
wherein the transmission spectrum of the optical body differs from both the transmission spectrum of the metallic layer and the transmission spectrum of the polymeric core within the visible spectrum.

54. The optical body of claim 53, wherein the transmission spectrum of the optical body differs from the transmission spectrum of the metallic layer and polymeric core by about 2 percent or more at one or more wavelengths within the visible region.

55. The optical body of claim 53, wherein the average transmission of the optical body within the visible spectrum differs from both the average transmission of the metallic layer and the average transmission of the polymeric core within the visible spectrum.

56. The optical body of claim 53, wherein the transmission spectrum of the optical body differs from both the transmission spectrum of the metallic layer and the transmission spectrum of the polymeric core within a wavelength band of interest within the visible spectrum.

57. An optical body comprising:
a single or multiple layer polymeric core comprising at least one oriented layer of a thermoplastic polymer material having dispersed therein a particulate pigment, and a metallic layer located on at least one outer surface of the polymeric core, the metallic layer having a transmission in the visible region of 1 to 90 percent, wherein the color scales of the optical body are $L^*_o$, $a^*_o$, and $b^*_o$, and wherein the $a^*_o$ and $b^*_o$ values range from about −5 to about 5 within the visible spectrum.

58. The optical body of claim 57, wherein the $a^*_o$ and $b^*_o$ values range from about −3 to about 3 within the visible spectrum.

* * * * *

UNITED STATES PATENT AND TRADEMARK OFFICE
CERTIFICATE OF CORRECTION

PATENT NO.     : 6,569,517 B1
DATED          : May 27, 2003
INVENTOR(S)    : McGurran, Daniel J.

It is certified that error appears in the above-identified patent and that said Letters Patent is hereby corrected as shown below:

Column 28,
Line 1, delete "a*, and b*," and insert in place thereof -- $a^*_0$, and $b^*_0$ --.

Signed and Sealed this

Twenty-eighth Day of October, 2003

JAMES E. ROGAN
*Director of the United States Patent and Trademark Office*